United States Patent
Beall et al.

(10) Patent No.: US 8,187,353 B2
(45) Date of Patent: *May 29, 2012

(54) FILTRATION STRUCTURES FOR IMPROVED PARTICULATE FILTER PERFORMANCE

(75) Inventors: Douglas Munroe Beall, Painted Post, NY (US); Achim Karl-Erich Heibel, Corning, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 604 days.

This patent is subject to a terminal disclaimer.

(21) Appl. No.: 12/357,016

(22) Filed: Jan. 21, 2009

(65) Prior Publication Data

US 2010/0180561 A1 Jul. 22, 2010

(51) Int. Cl.
*B01D 50/00* (2006.01)

(52) U.S. Cl. ............. 55/484; 55/485; 55/522; 55/523; 55/385.1; 55/DIG. 30; 60/311; 422/180; 428/116; 428/117

(58) Field of Classification Search .............. 55/484, 55/485, 522, 523, 385.1, DIG. 30; 502/527.9; 60/311; 422/180; 428/116, 117

See application file for complete search history.

(56) References Cited

U.S. PATENT DOCUMENTS

| | | | |
|---|---|---|---|
| 4,390,355 A | 6/1983 | Hammond, Jr. et al. | |
| 5,212,131 A | 5/1993 | Belding | |
| 5,758,497 A * | 6/1998 | Frederiksen et al. | 60/299 |
| 6,773,481 B2 * | 8/2004 | Noguchi et al. | 55/523 |
| 6,843,822 B2 * | 1/2005 | Beall et al. | 55/523 |
| 6,864,198 B2 | 3/2005 | Merkel | |
| RE38,888 E * | 11/2005 | Beall et al. | 501/119 |
| 7,071,135 B2 * | 7/2006 | Ogunwumi et al. | 501/134 |
| 7,141,089 B2 * | 11/2006 | Beall et al. | 55/523 |
| 7,179,316 B2 | 2/2007 | Merkel et al. | |
| 7,247,184 B2 | 7/2007 | Frost | |
| 7,309,371 B2 * | 12/2007 | Merkel et al. | 55/523 |
| 7,384,442 B2 * | 6/2008 | Bardhan et al. | 55/523 |
| 7,485,170 B2 * | 2/2009 | Beall et al. | 55/523 |
| 7,520,911 B2 * | 4/2009 | Beall et al. | 55/523 |
| 7,563,744 B2 * | 7/2009 | Klein et al. | 502/326 |
| 7,601,194 B2 * | 10/2009 | Beall et al. | 55/523 |
| 7,704,296 B2 * | 4/2010 | Merkel | 55/523 |
| 7,833,606 B2 * | 11/2010 | Suwabe et al. | 428/116 |
| 7,887,897 B2 * | 2/2011 | Lu et al. | 428/116 |
| 7,960,009 B2 * | 6/2011 | Backhaus-Ricoult et al. | 428/116 |
| 2004/0033175 A1 * | 2/2004 | Ohno et al. | 422/180 |
| 2004/0261384 A1 * | 12/2004 | Merkel et al. | 55/523 |
| 2005/0158534 A1 * | 7/2005 | Tabuchi et al. | 428/304.4 |
| 2007/0028575 A1 * | 2/2007 | Ohno et al. | 55/523 |
| 2007/0119134 A1 | 5/2007 | Beall et al. | 55/523 |
| 2007/0140928 A1 | 6/2007 | Beall et al. | |
| 2007/0261378 A1 | 11/2007 | Miao et al. | 55/523 |
| 2008/0032090 A1 * | 2/2008 | Beall et al. | 428/116 |
| 2008/0047243 A1 | 2/2008 | Beall et al. | |
| 2008/0110143 A1 | 5/2008 | Chen et al. | 55/385.1 |

(Continued)

*Primary Examiner* — Jason M Greene
*Assistant Examiner* — Dung H Bui
(74) *Attorney, Agent, or Firm* — Matthew B. McNutt (57) ABSTRACT

A particulate filter may comprise an inlet end, an outlet end, and a plurality of channels disposed and configured to flow fluid from the inlet end to the outlet end, wherein the channels are defined by porous walls configured to trap particulate matter. The porous walls may have a total porosity greater than about 45%, a median pore size ranging from about 13 micrometers to about 20 micrometers, and a pore size distribution such that pores less than 10 micrometers contribute less than about 10% porosity.

14 Claims, 6 Drawing Sheets

U.S. PATENT DOCUMENTS

| | | | |
|---|---|---|---|
| 2008/0138569 A1* | 6/2008 | Collier et al. | 428/116 |
| 2008/0202107 A1* | 8/2008 | Boorse et al. | 60/301 |
| 2008/0241013 A1* | 10/2008 | Ohno et al. | 422/180 |
| 2008/0276586 A1* | 11/2008 | Oya et al. | 55/523 |
| 2008/0307760 A1* | 12/2008 | Chatlani et al. | 55/523 |
| 2009/0022943 A1* | 1/2009 | Tomita et al. | 428/116 |
| 2009/0087613 A1* | 4/2009 | Lu et al. | 428/117 |
| 2009/0142543 A1* | 6/2009 | Suwabe et al. | 428/116 |
| 2009/0291839 A1* | 11/2009 | Kunieda et al. | 502/74 |
| 2010/0098903 A1* | 4/2010 | Tsuneyoshi et al. | 428/116 |
| 2010/0126144 A1* | 5/2010 | He et al. | 60/286 |
| 2010/0205921 A1* | 8/2010 | Okazaki et al. | 55/523 |
| 2010/0310819 A1* | 12/2010 | Suwabe et al. | 428/116 |

* cited by examiner

FIG. 7  2"x6"
Q=26.25 cfm
MPS=20 μm
6 %<10 μm, 10.25 %>40 μm

FIG. 8  2"x6"
Q=26.25 cfm
52% porosity
MPS = 19 μm

FILTRATION STRUCTURES FOR IMPROVED PARTICULATE FILTER PERFORMANCE

TECHNICAL FIELD

The present teachings relate to filtration structures. In particular, the present teachings relate to filtration structures having properties suitable for use in post-combustion applications, such as, for example, exhaust gas filtration.

BACKGROUND

Environmental concerns have motivated the implementation of emission requirements for internal combustion engines and other combustion systems throughout much of the world. Catalytic converters implemented in exhaust gas after-treatment systems have been used to eliminate many of the pollutants present in exhaust gas; however, a filter is often required to remove particulate matter, such as, for example, ash and soot. Wall-flow particulate filters, for example, are often used in engine systems to remove particulates, such as soot and ash, from the exhaust gas. Such particulate filters may be made of a honeycomb-like substrate with parallel flow channels or cells separated by internal porous walls. Inlet and outlet ends of the flow channels may be selectively plugged, such as, for example, in a checkerboard pattern, so that exhaust gas, once inside the substrate, is forced to pass through the internal porous walls, whereby the porous walls retain a portion of the particulates in the exhaust gas. Particulate capture by the porous walls can occur in two different stages: at first, inside the porous wall (deep-bed filtration), and later, on the porous wall in the flow channels (cake-bed filtration).

In this manner, wall-flow particulate filters have been found to be effective in removing particulates, such as, for example, ash and soot, from exhaust gas. However, the pressure drop across the wall-flow particulate filter increases as the amount of particulates trapped in the porous walls and channels increases. For a filter that is not conditioned (e.g., that does not have enough of an ash layer to stop particulate matter from penetrating the porous filter walls), there is generally a rapid increase in pressure drop during the initial deep-bed filtration stage (in which typically less than 1 g/L (grams per liter) of particulate is captured in the filter), followed by a gradual increase in pressure drop with particulate loading during the cake-bed filtration stage. The increasing pressure drop results in a gradual rise in back pressure against the engine, and a corresponding decrease in the performance of the engine.

A filter's geometric and microstructural properties can not only influence the filtration efficiency (FE) of a filter, but can also affect the initial pressure drop during the deep-bed filtration stage. For example, the initial increase in pressure drop is more influenced by a filter's microstructural properties in the deep-bed filtration stage than by its geometric properties, which tend to have more of an effect in the cake-bed filtration stage. It may be desirable, therefore, to provide microstructural properties that not only result in high filter FE prior to any particulate loading of the filter (i.e., when the filter is clean), but also achieve a relatively low deep-bed filtration related initial back pressure increase, thereby minimizing the filter's pressure drop while it is clean and during the initial stage of deep-bed filtration.

Moreover, as will be explained further below, it may be desirable to provide a filtration structure in which the pressure drop across the filter remains relatively low prior to soot loading of the filter (e.g., when the filter is clean), as well as during the initial stage of soot loading (i.e., during deep-bed filtration).

SUMMARY

The present teachings may solve one or more of the above-mentioned problems and/or may demonstrate one or more of the above-mentioned desirable features. Other features and/or advantages may become apparent from the description that follows.

In accordance with various exemplary embodiments, the present teachings provide a particulate filter comprising an inlet end, an outlet end, and a plurality of channels disposed and configured to flow fluid from the inlet end to the outlet end, wherein the channels are defined by porous walls configured to trap particulate matter. The porous walls may have a total porosity greater than about 45%, a median pore size ranging from about 13 micrometers to about 20 micrometers, and a pore size distribution such that pores less than 10 micrometers contribute less than about 10% porosity.

Additional objects and advantages will be set forth in part in the description which follows, and in part will be obvious from the description, or may be learned by practice of the present teachings. The objects and advantages may be realized and attained by means of the elements and combinations particularly pointed out in the appended claims.

It is to be understood that both the foregoing general description and the following detailed description are exemplary and explanatory only and are not restrictive of the claims.

BRIEF DESCRIPTION OF THE DRAWINGS

The invention can be understood from the following detailed description either alone or together with the accompanying drawings. The drawings are included to provide a further understanding of the invention, and are incorporated in and constitute a part of this specification. The drawings illustrate one or more exemplary embodiments and together with the description serve to explain various principles and operation.

DESCRIPTION OF EXEMPLARY EMBODIMENTS

In a particulate filter, such as, for example, a wall-flow or partial-flow particulate filter, as particulate matter (e.g., soot and ash) from a fluid stream (e.g., an exhaust gas stream) is initially captured within the porous walls of the filter (the deep-bed filtration stage), a relatively large increase in back pressure occurs which may negatively impact the efficiency of the combustion system. For example, fuel economy may decrease in an automotive or other combustion system application. At the same time, however, FE increases from a clean filter FE to a maximum level. This is due to the particulate deposited within the walls of the filter acting as a filtering medium itself and enabling more particulate to be deposited thereon. Once the cake-bed filtration stage is reached (i.e., particulate matter is captured on the walls of the filter in the channel rather than inside the wall), the FE remains substantially constant at the maximum level, and the increase in back pressure is much more gradual than in the deep-bed filtration stage.

The present teachings contemplate particulate filters that produce a low pressure drop when the filter is clean (i.e., prior to soot loading) and a relatively low initial back pressure increase during deep-bed filtration, while also exhibiting a relatively high FE. In other words, various exemplary embodiments of the present teachings consider particulate filter configurations that initially have a relatively low pressure drop before soot build up on the surface of the porous walls of the filter (e.g., prior to and during deep-bed filtration). A filter's microstructural properties, such as, for example, pore size, porosity and/or pore size distribution determined in accordance with various exemplary embodiments of the present teachings may be sufficient to provide a low pressure drop across the filter while it is clean (before soot buildup) and a relatively low initial back pressure increase (i.e., relatively shallow slope of the curve of pressure drop versus particulate loading or a low pressure drop response to particulate loading) during deep-bed filtration (when soot is building up within the walls of the filter).

In various exemplary embodiments of the present teachings, particulate filters are disclosed having a microstructure that can produce a low clean pressure drop and a relatively low initial increase in back pressure during deep-bed filtration particulate loading, thereby enhancing the engine's fuel economy and increasing the filter's filtration efficiency.

As used herein, the term "particulate filter" or "filter" refers to a structure which is capable of removing particulate matter from a fluid stream passing through the structure. The present teachings may apply to the removal of any particulate matter from any fluid stream, and the fluid stream may be in the form of a gas or a liquid. The gas or liquid may also contain another phase, such as a solid particulate in either a gas or liquid stream, or droplets of liquid in a gas stream. Non-limiting, exemplary fluid streams include exhaust gases produced by internal combustion engines, such as, for example, diesel and gasoline engines, aqueous liquid streams, and coal combustion flue gases produced in a coal gasification process.

The particulate matter may be in any phase. Thus, the particulate matter may be present, for example, as a liquid or a solid in a gas fluid stream, or as a solid in a liquid fluid stream. Exemplary particulate matter includes, for instance, diesel particulate matter (e.g. the particulate component of diesel exhaust from diesel cars and trucks), which includes diesel soot and aerosols such as ash particulates, metallic abrasion particles, sulfates, and/or silicates, for example. As used herein, the term "soot" refers to impure carbon particles that result from the incomplete combustion of hydrocarbons during the internal combustion process. The term "ash" refers to non-combustible metallic material that is found in almost all petroleum products. For diesel applications, ash is typically produced from crankcase oil and/or fuel borne catalysts.

The particulate filters of the present teachings can have any shape or geometry suitable for a particular application, as well as a variety of configurations and designs, including, but not limited to, for example, a wall-flow monolith structure or a partial-flow monolith structure (i.e., any combination of a wall-flow monolith structure and a flow-through monolith structure). Exemplary wall-flow monoliths include, for example, any monolithic structure comprising channels or porous networks or other passages with individual passages open and plugged at opposite ends of the structure, thereby enhancing fluid flow through the channel walls of the monolith as the fluid flows from one end to the other. Exemplary partial-flow monoliths include, for example, any monolithic structure that is partially wall-flow, as described above, and partially flow-through wherein some of the channels or porous networks or other passages are open at both ends and permit the flow of a fluid stream through the monolith passages from one end to an opposite end. Various exemplary embodiments of the present teachings contemplate utilizing the cellular geometry of a honeycomb configuration due to its high surface area per unit volume for deposition of particulate matter. Those having ordinary skill in the art will understand that the cross-section of the cells of a honeycomb structure may have virtually any shape and are not limited to square or hexagonal. Similarly, and as may be further understood from the teachings below, a honeycomb structure may be configured as either a wall-flow structure or partial-flow structure.

Figure 1:
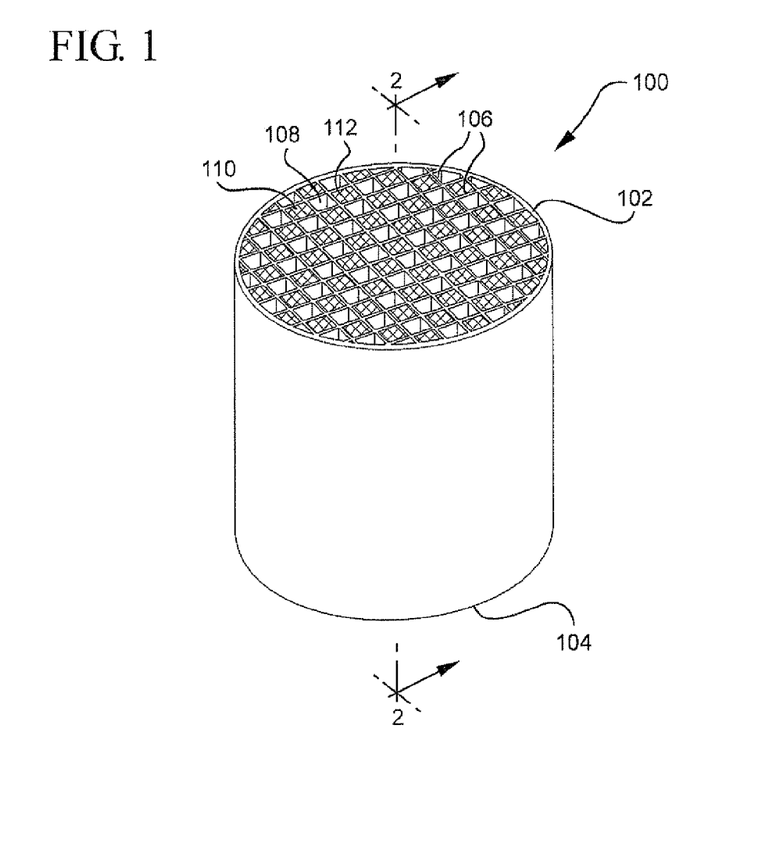
FIG. 1 is a perspective view of one exemplary embodiment of a particulate filter in accordance with the present teachings.

FIG. 1 illustrates one exemplary embodiment of a particulate filter suitable for practice of the present teachings. The particulate filter 100 has an inlet end 102 an outlet end 104, and a plurality of channels 108, 110 extending from the inlet end 102 to the outlet end 104. The channels 108, 110 are defined by intersecting porous walls 106, thereby forming a generally honeycomb configuration. Although the particulate filter 100 is depicted with channels having a substantially square cross-section (i.e., in a plane perpendicular to a longitudinal axis of the filter 100), those ordinarily skilled in the art would understand that channels 108, 110 can have various additional geometries, such as, for example, cross-sections that are circular, square, triangular, rectangular, hexagonal, sinusoidal, or any combination thereof, without departing from the scope of the present teachings.

Additionally, although the particulate filter 100 is depicted as cylindrical, those skilled in the art would understand that such shape is exemplary only and particulate filters in accordance with the present teachings may have a variety of shapes, including, but not limited to, oval-shaped, block-shaped, cube-shaped, triangular-shaped, etc.

The particulate filter 100 may be made of any suitable material, and the porous walls 106 are not limited to any particular porous material. Exemplary materials include a variety of porous ceramics, including, but not limited to, cordierite, silicon carbide, silicon nitride, aluminum titanate, eucryptite, calcium aluminate, zirconium phosphate, and spondumene. In various exemplary embodiments, the particulate filter 100 may be formed as a monolithic structure, for example, via extruding and/or molding. Those having ordinary skill in the art are familiar with the various techniques for forming such ceramic monolithic structures. Particulate filters may in various exemplary embodiments also include a skin forming an outer peripheral lateral surface of the filter. The skin may be made of the same or a different material than the porous walls, and in various embodiments may be thicker than the porous walls.

Figure 2:
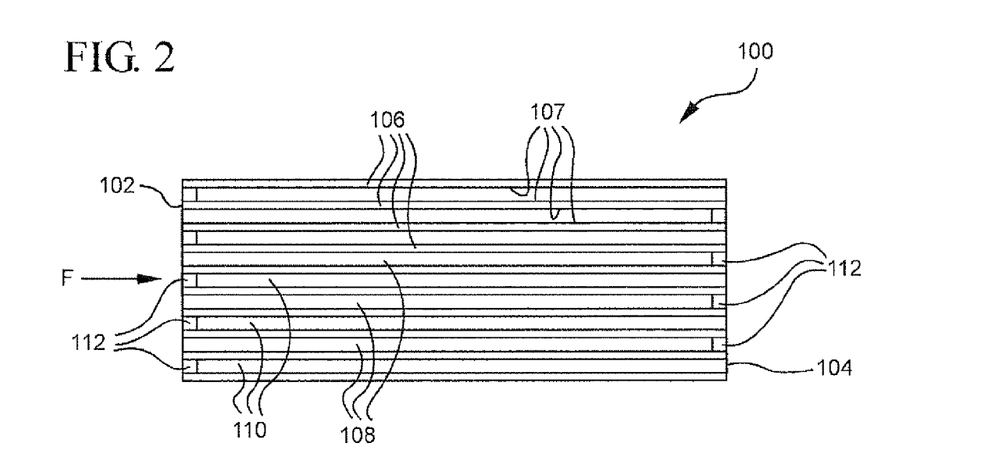
FIG. 2 is a schematic cross-sectional view of the particulate filter of FIG. 1.

As depicted in FIGS. 1 and 2, various exemplary embodiments of the present teachings further contemplate the particulate filter 100 with one or more selectively plugged channel ends to provide a wall-flow structure that allows for more intimate contact between the fluid stream and the porous walls 106. FIG. 2 is a schematic cross-sectional view of the particulate filter 100 of FIG. 1 taken through line 2-2, depicting channels 108, 110 in the particulate filter 100. Alternate channels 108 and 110 are blocked with plugs 112 at opposite ends. In the exemplary embodiment of FIGS. 1 and 2, for example, the channels 110 are blocked by plugs 112 at the inlet end 102 of the filter 100 and the channels 108 are blocked by plugs 112 at the outlet end 104 of the filter 100. This blocking of the channels 108, 110 forces convection of fluid through the porous walls 106. Fluid flowing in the direction arrow F enters the particulate filter 100 through channels 108 via the inlet end 102, but is blocked by plugs 112 in the channels at the outlet end 104. That blockage causes a pressure build-up within the blocked channels 108 which forces the fluid to pass through the porous walls 106 of the channels 108. As the fluid is forced through the porous walls 106, particulate matter is trapped in and on the walls 106 while the fluid passes through unobstructed. The filtered fluid then enters the adjacent channels 110 and exits the particulate filter 100 through channels 110 via the outlet end 104.

The plugs 112 may be made of any suitable material, and are not limited to any particular plugging paste or material. In various exemplary embodiments, for example, in particular for filters made from cordierite, the plugs 112 may be formed from a cordierite grog used with binders and fillers. Exemplary plugs, for example, may also include a plugging paste consisting of a mixture of aluminum titanate powder, calcium aluminate powder, Kaowool® aluminosilicates fibers, silica sol, methyl cellulose binder and water, cured by heating.

As discussed above, and in accordance with various exemplary embodiments of the present teachings, the porous walls 106 can trap particulate matter in various different ways, such as, for example, inside the thickness of the porous walls 106 and on surfaces 107 of the porous walls 106. As described above, trapping particulate matter inside the filter wall is commonly referred to as deep-bed filtration. Beyond a certain point, however, the deposition of particulate matter in the porous walls 106 can decrease the wall permeability sufficiently so that any subsequent particulate matter capture is on the surfaces 107 of the porous walls 106, referred to as cake-bed filtration.

Those having skill in the art will appreciate that the pattern of the plugged channel ends shown in FIGS. 1 and 2 and described above is exemplary only and that other arrangements of plugged channels may be utilized without departing from the scope of the present teachings. Moreover, those having skill in the art will appreciate that partial-flow filter structures also may be utilized (i.e., where some channels of the filter are open at both ends) without departing from the scope of the present teachings. The description above regarding deep-bed filtration and cake-bed filtration, and the pressure drop responses associated with such filtration periods, applies equally to partial-flow filter structures as it does to wall-flow filter structures, as at least some fluid flowing through the channels in a partial-flow filter structure passes through the porous filter walls resulting in trapping of particulate matter within those walls.

As discussed above, the porous wall structural properties of a particulate filter, such as, for example a particulate filter like the particulate filter 100 of FIGS. 1 and 2, influence an engine's fuel economy and the particulate filter's filtration efficiency. As will be described in more detail below, the inventors have discovered that a particulate filter that achieves a low clean pressure drop and a low back pressure increase during deep-bed filtration may promote fuel economy and filtration efficiency. The inventors have discovered porous wall structural properties (e.g., microstructural properties) that can achieve a low clean pressure drop and a low initial back pressure increase during initial soot loading (deep-bed filtration).

As used herein, the term "clean pressure drop" refers to the resulting pressure drop of a fluid as it flows through the particulate filter, from the inlet end to the outlet end, when the particulate filter is clean. Accordingly, a particulate filter with "a low clean pressure drop" refers to a filter that initially allows a fluid to pass relatively freely, resulting in a low pressure drop of the fluid as it flows through the filter. As used herein, a particulate filter with "a low initial back pressure increase" refers to a filter that has a low increase in initial back pressure drop related to the deep-bed filtration stage of particulate filtration. As used herein, the term "pressure drop response to particulate loading" refers to the resulting change in pressure drop of the fluid as it flows through the particulate filter from the inlet end to the outlet end, as the filter becomes dirty and loaded with particulate matter. As used herein, the reference to a low or shallow pressure drop response to particulate loading of the particulate filter during a deep-bed filtration stage refers to a filter that exhibits a diminished sensitivity to particulate loading (as compared with conventional filters) during the initial stage of deep-bed filtration, resulting in a relatively low increase in pressure drop (as compared with conventional filters) of the fluid passing therethrough as the particulate filter is loaded with particulate matter. As discussed above and further explained below, the inventors have discovered various particulate filter porous wall properties (e.g., microstructural properties) that result in a particulate filter that exhibits the above-noted low pressure drop and low initial back pressure increase (e.g., low pressure drop response to particulate loading) during the deep-bed filtration stage.

As discussed above, the present teachings contemplate using various microstructural properties of a particulate filter in order to achieve the desired low clean pressure drop, high filtration efficiency, and reduced increase in initial back pressure during deep-bed filtration. To determine these microstructural properties, the inventors used modeling data and experimental data to obtain a range of structural design variables for a particulate filter with these desirable characteristics, shown and described below with reference to FIGS. 3-8.

Figure 3A:
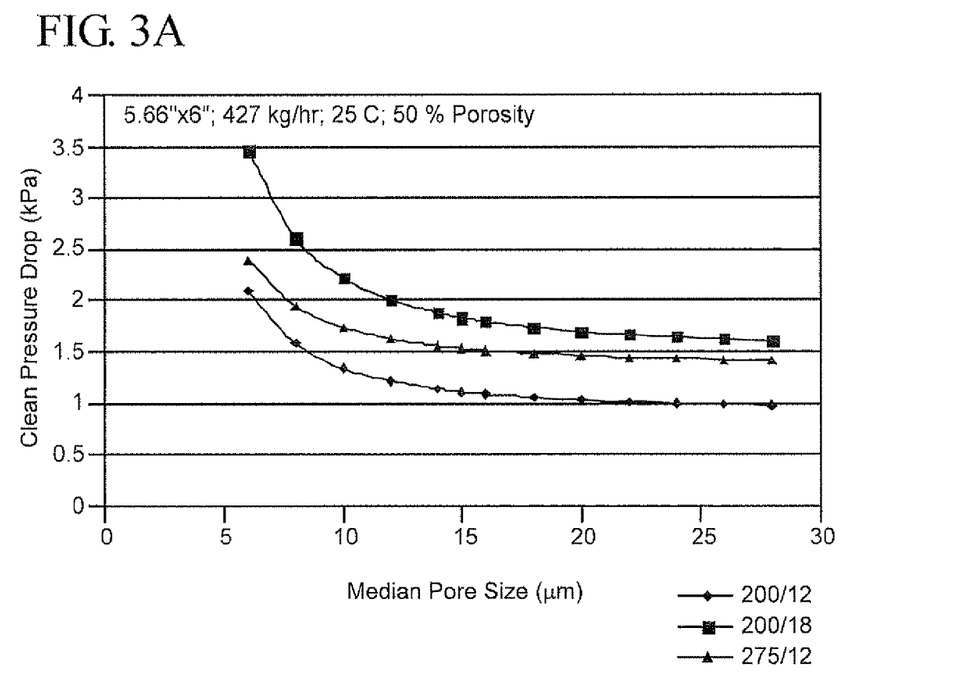
FIG. 3A shows results obtained from modeling data of clean pressure drop as a function of wall median pore size corresponding to filters of various geometries.
Figure 3B:
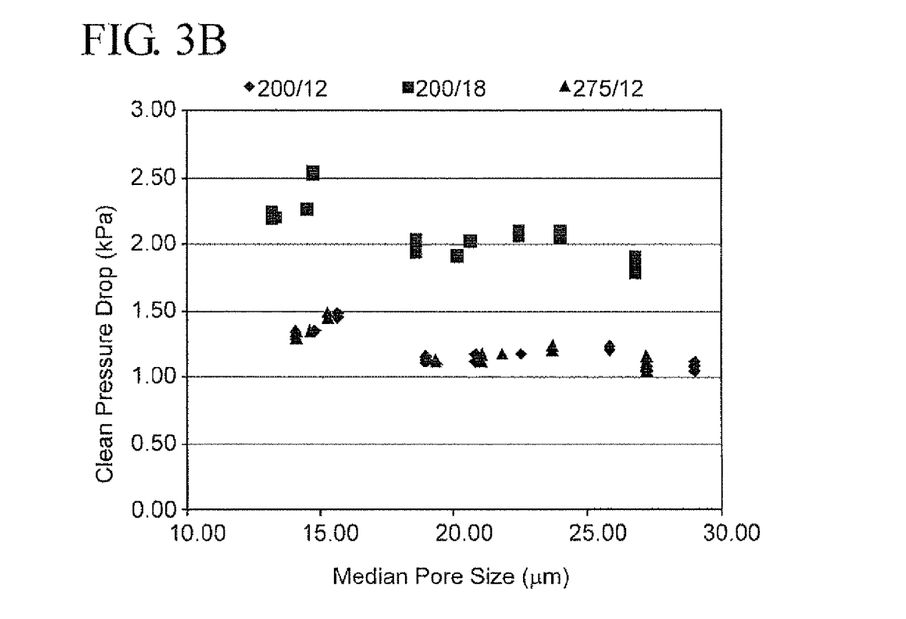
FIG. 3B shows results obtained from experimental tests of clean pressure drop as a function of wall median pore size corresponding to filters of various geometries.
Figure 4A:
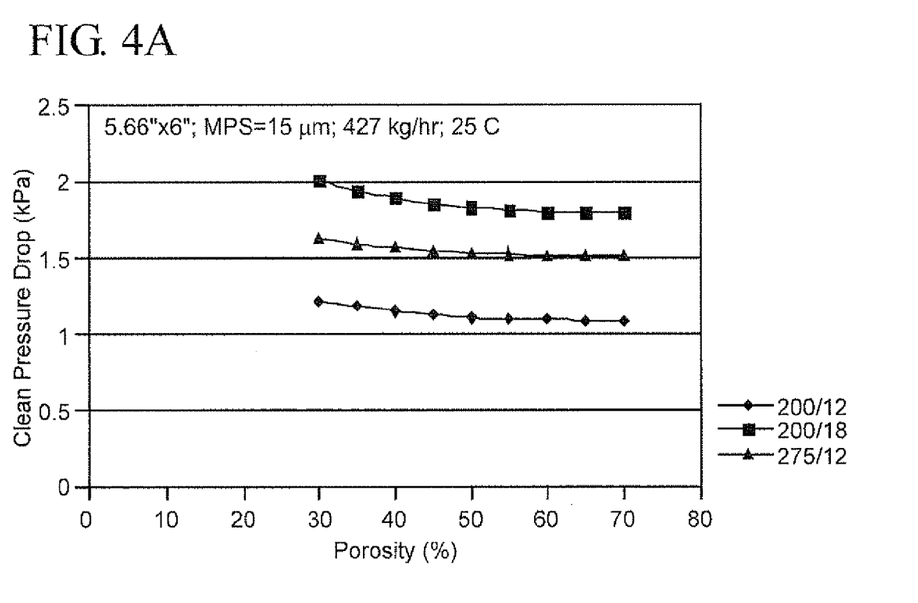
FIG. 4A shows results obtained from modeling data of clean pressure drop as a function of wall porosity corresponding to filters of various geometries.

The sensitivity of clean pressure drop to wall median pore size and wall porosity is shown in FIGS. 3A and 3B, and FIGS. 4A and 4B respectively, for various combinations of wall cell density/wall thickness, 200 cpsi (cells per square inch)/12 mils (mils=1/1000 of an inch), 200 cpsi/18 mils and 275 cpsi/12 mils. In FIGS. 3A and 4A, a 5.66 inch diameter by 6 inch length particulate filter was modeled at a gas flow rate of 427 kg/hr at 25° C. As shown by FIG. 3A, the clean pressure drop for a particulate filter with a porosity of about 50% increases appreciably for wall median pore sizes less than about 13 μm, with wall median pore sizes greater than about 13 μm resulting in only a modest decrease in clean pressure drop. As shown by FIG. 4A, the clean pressure drop for a particulate filter with a wall median pore size of about 15 μm decreases modestly with an increase in wall porosity. Based on the modeling results shown in FIGS. 3A and 4A, therefore, clean pressure drop is relatively insensitive to an increase in wall porosity, but relatively sensitive to a decrease in wall median pore size, for example, lower than about 13 μm.

Figure 4B:
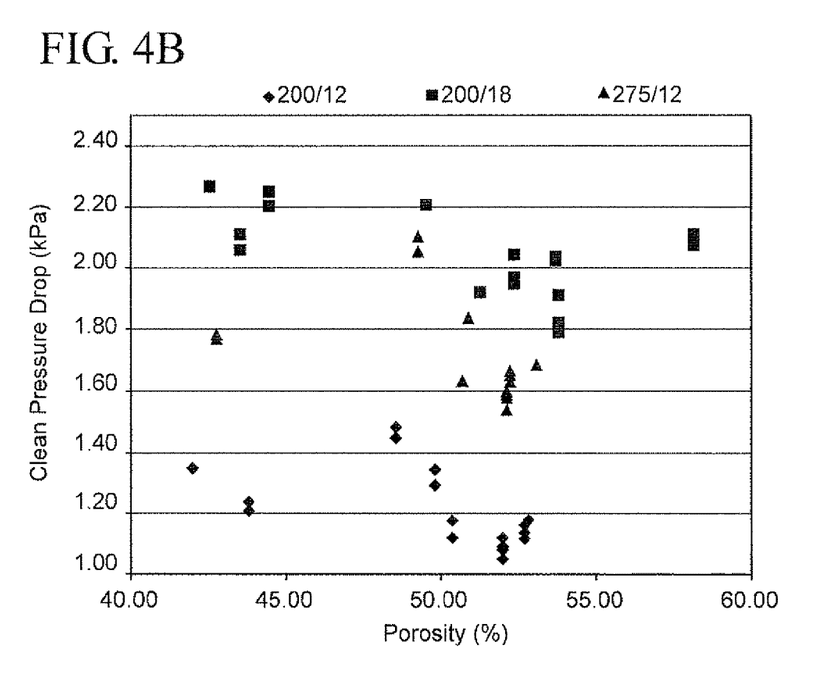
FIG. 4B shows results obtained from experimental tests of clean pressure drop as a function of wall porosity corresponding to filters of various geometries.

In FIGS. 3B and 4B, experimental tests were performed on filters with various combinations of wall cell density/wall thickness (i.e., 200 cpsi/12 mils corresponding to the diamonds on the plot, 200 cpsi/18 mils corresponding to squares on the plot, and 275 cpsi/12 mils corresponding to triangles on the plot), with a 5.66 inch diameter by 6 inch length at a gas flow rate of 427 kg/hr at 25° C. Similar to the modeled data described above in FIGS. 3A and 4A, FIG. 3B illustrates that clean pressure drop was relatively insensitive to an increase in wall porosity, while FIG. 4B illustrates that clean pressure drop was relatively sensitive to a decrease in wall median pore size.

Figure 5A:
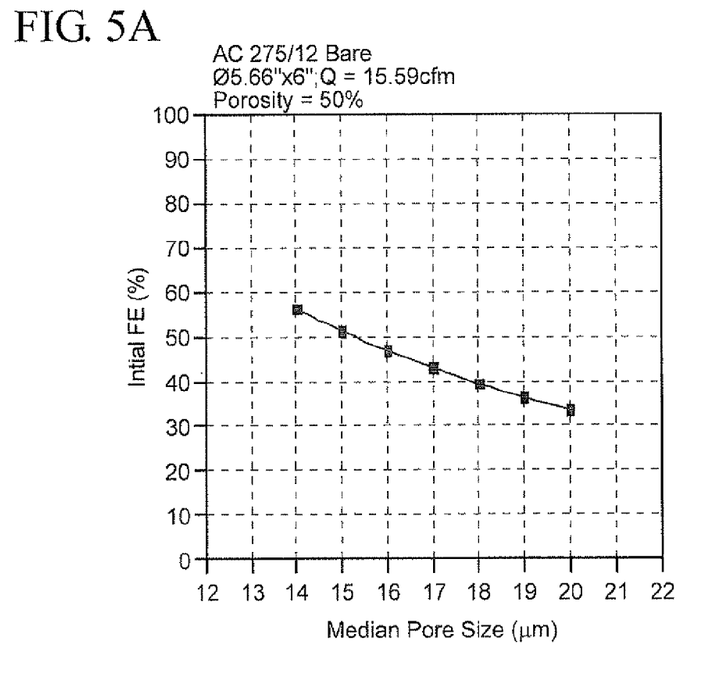
FIG. 5A shows results obtained from modeling data of clean filter efficiency as a function of wall median pore size.
Figure 5B:
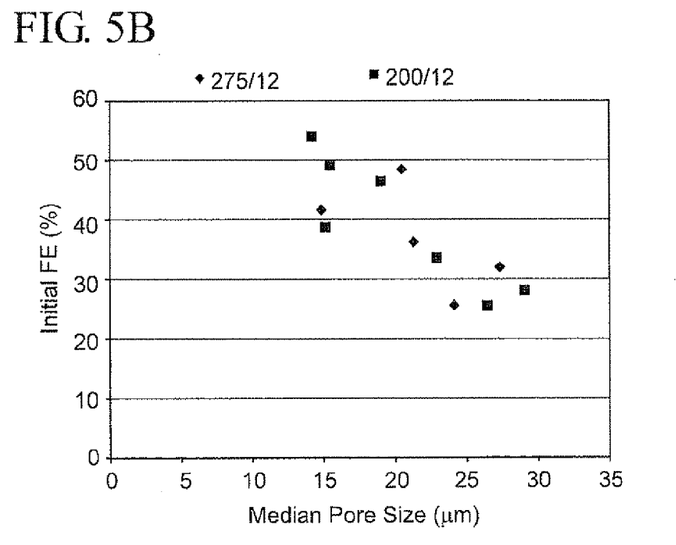
FIG. 5B shows results obtained from experimental tests of clean filter efficiency as a function of wall median pore size.
Figure 6A:
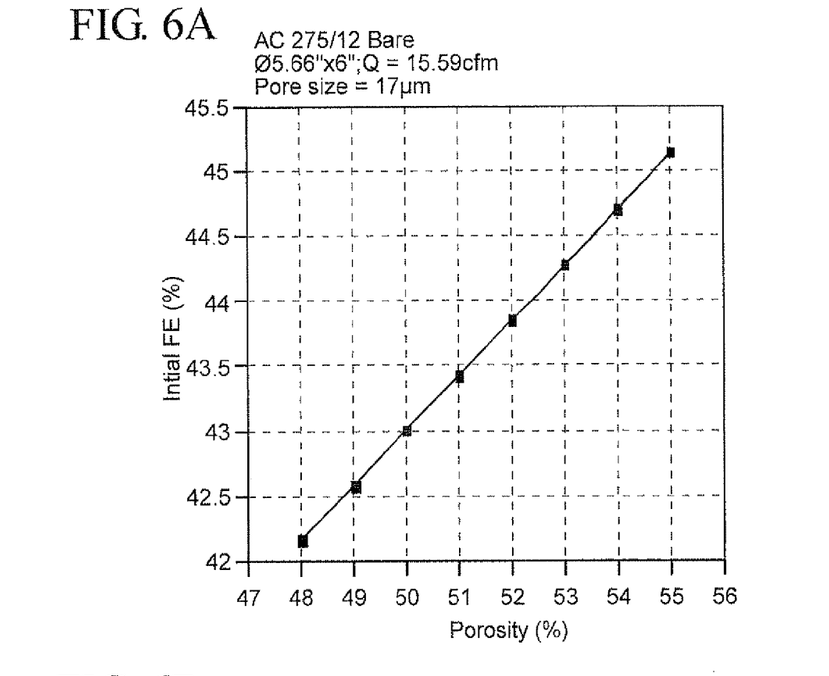
FIG. 6A shows results obtained from modeling data of clean filter efficiency as a function of wall porosity.

The sensitivity of initial (clean filter) filter efficiency to wall median pore size and wall porosity is shown in FIGS. 5A and 5B, and FIGS. 6A and 6B respectively. In FIGS. 5A and 6A, a filter with a wall cell density of 275 cpsi, a wall thickness of 12 mils, a diameter of 5.66 inches and a length of 6 inches was modeled at a gas flow rate of 15.59 cfm (cubic feet per minute) at 25° C. As shown by FIG. 5A, when the wall median pore size decreases from about 20 μm to about 14 μm, the initial filter efficiency (FE) for a particulate filter with a wall porosity of about 50% increases from about 34% to about 58%. As shown by FIG. 6A, when a filter's wall porosity increases from about 48% to about 55%, the initial filter efficiency for a particulate filter with a median pore size of about 17 μm increases from about 42% to about 45%. Based on the modeling data shown in FIGS. 5A and 6A, initial filter efficiency is, therefore, shown to be relatively insensitive to an increase in wall porosity, but relatively sensitive to a decrease in wall median pore size, increasing appreciably with a decrease in wall median pore size.

Figure 6B:
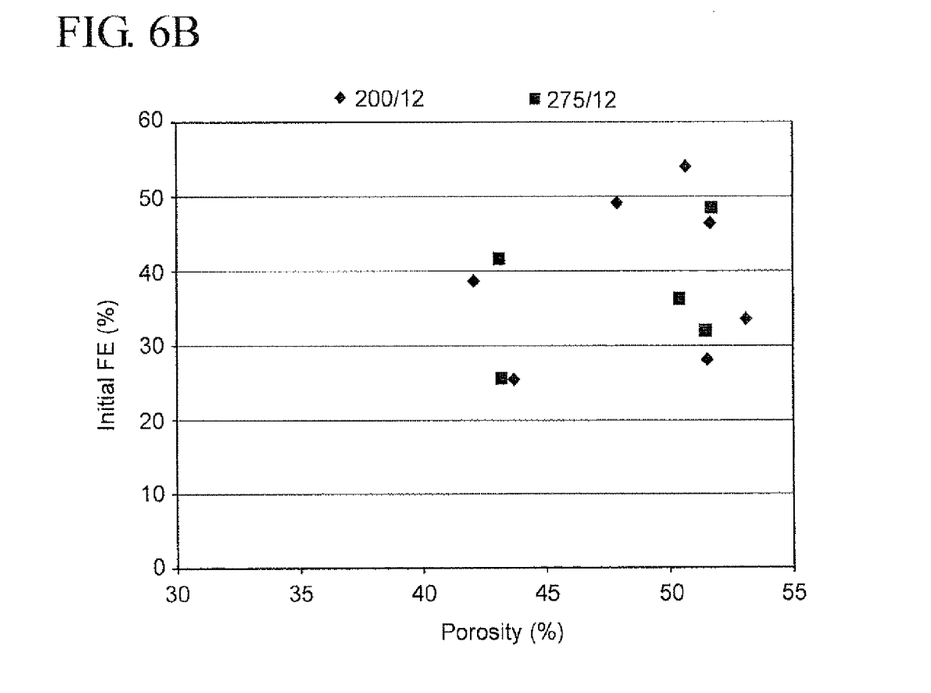
FIG. 6B shows results obtained from experimental tests of clean filter efficiency as a function of wall porosity.

Similarly, in FIGS. 5B and 6B, experimental tests were run on actual filters with various combinations of wall cell density/wall thickness, i.e., 275 cpsi/12 mils (275/12 corresponding to the squares on the plots) and 200 cpsi/12 mils (200/12 corresponding to the diamonds on the plots), diameters of 5.66 inches and lengths of 6 inches at a gas flow rate of 15.59 cfm at 25° C. Similar to the modeled data described above, FIG. 6B further illustrates that initial filter efficiency was relatively insensitive to an increase in wall porosity, while FIG. 5B further illustrates that initial filter efficiency was relatively sensitive to a decrease in wall median pore size.

Figure 7:
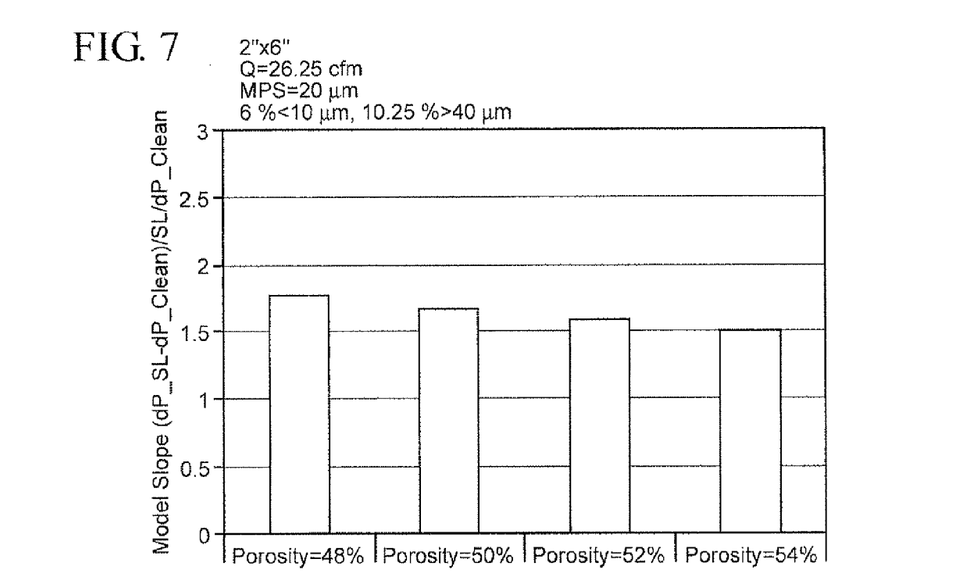
FIG. 7 shows results obtained from modeling data illustrating the influence of wall porosity on the slope of initial back pressure drop due to deep-bed filtration.

FIG. 7 shows the results obtained from modeling data illustrating the influence of wall porosity on the slope of initial back pressure drop due to deep-bed filtration. As illustrated in FIG. 7, for a particulate filter modeled at a gas flow rate of 26.25 cfm at 25° C., with a diameter of 2 inches, a length of 6 inches, and a median pore size of about 20 μm, wherein pores less than 10 μm contributed to about 6% porosity and pores greater then 40 μm contributed to about 10.25% porosity, initial pressure drop slope (measured on the y-axis) decreases with an increase in wall porosity from 48% to 54%.

Based on the modeling data and experimental data presented in FIGS. 3-7, therefore, in an effort to achieve a desired low clean pressure drop, low initial back pressure increase during deep-bed filtration, and filter efficiency behavior of a particulate filter, exemplary embodiments of the present teachings contemplate using structures comprising porous walls having a median pore size ranging from about 13 μm to about 20 μm, or about 13 μm to about 16 μm, which may result in a relatively high filter efficiency performance without a significant increase in the filter's clean pressure drop behavior. Furthermore, while clean pressure drop may improve only modestly with increasing wall porosity, a larger wall porosity can also help to reduce the high initial back pressure that results from deep-bed filtration. Accordingly, the present teachings further contemplate using particulate filter structures having porous walls with a total porosity greater than about 45%. Additional exemplarily embodiments of the present teachings also consider particulate filters with porous walls having a total porosity ranging between about 45% and about 60% in order to account for the possible negative impacts on the filter's bulk density/thermal mass that can result from higher porosity levels.

Figure 8:
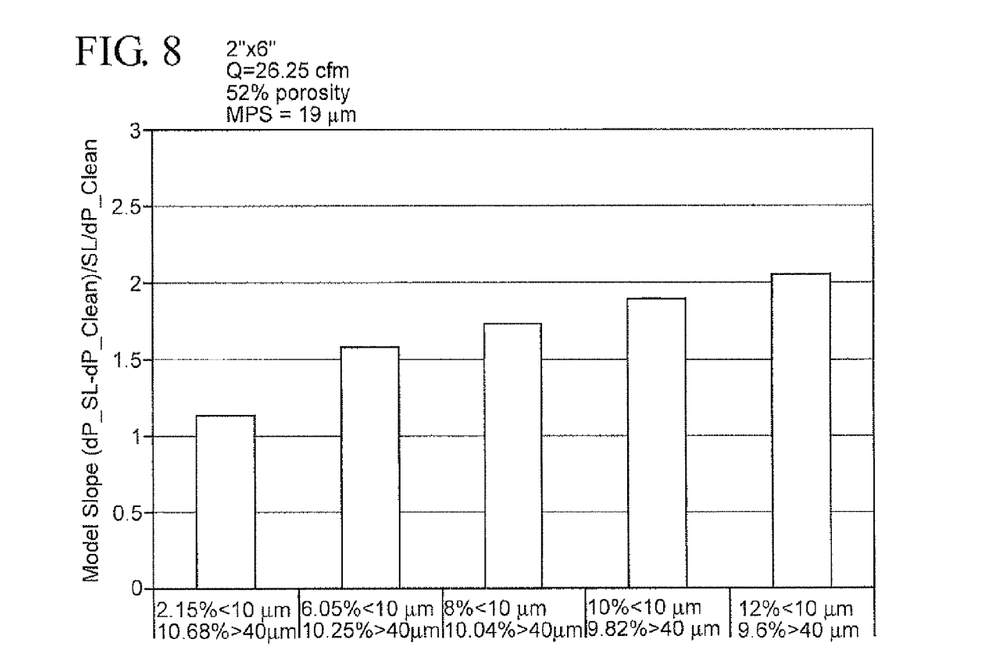
FIG. 8 shows results obtained from modeling data illustrating the influence of wall pore size distribution on the slope of initial back pressure drop due to deep-bed filtration.

FIG. 8 shows results obtained from modeling data illustrating the influence of wall pore size distribution on the slope of initial back pressure drop due to deep-bed filtration. As illustrated in FIG. 8, initial back pressure drop is relatively sensitive to the porosity that is contributed by pores with sizes less than 10 μm (fine pores as determined by mercury porosimetry technique). As shown, for a particulate filter modeled at a gas flow rate of 26.25 cfm at 25° C., with a diameter of 2 inches, a length of 6 inches, a median pore size of about 19 μm and a porosity of 52%, the slope of initial pressure drop during deep-bed filtration increases about 66% when the porosity contributed by pores of sizes less than 10 μm increases from about 2.15% to about 12% (while the porosity contributed by pores of sizes greater than 40 μm respectively decreases from about 10.68% to about 9.6% in order to maintain a constant median of the distribution.) Accordingly, providing a filter structure that has a pore size distribution such that pores less than 10 μm contribute less than about 10% porosity, for example, less than about 6% porosity, for example, less than about 2% porosity, may be desirable to help reduce initial pressure drop increase during the deep-bed filtration stage.

Those having ordinary skill in the art would understand that the results and corresponding microstructural properties shown and described with reference to FIGS. 3-8 are exemplary only and not intended to be limiting of the scope of the present teachings or claims. For example, the properties of the fluid stream entering the structure, such as, for example, temperature, pressure, concentration of contaminants and/or other substances in the fluid, and flow rate (both into, through and out of the system), may also present factors to consider to select a filter's microstructural properties in accordance with the present teachings. Accordingly, those skilled in the art will understand that the particulate filters of the present teachings may include a plurality of microstructural parameters that achieve a low clean pressure drop, high filtration efficiency and low increase in initial back pressure due to deep-bed filtration.

Other characteristics of the particulate filters of the present teachings may also be altered as desired, including the materials used for the structures, the structural configuration (e.g., dimensions, shapes, etc.) of the channels, and/or properties of the fluid stream entering the structure, such as, for example, temperature, pressure, concentration of contaminants and/or other substances in the fluid, and flow rate (including into, through and out of the system). Ordinarily skilled artisans will understand that based on various parameters of the overall after-treatment system operation and of the fluid stream for which treatment is desired at least some of the various characteristics and features described above may be selected so as to help achieve a low clean pressure drop, high filtration efficiency and low increase in initial back pressure during deep-bed filtration.

For example, in one exemplary application of the present teachings, a particulate filter may also contemplate various geometric properties as disclosed, for example, in U.S. application Ser. No. 12/356,965, entitled "Particulate Filters and Methods for Regenerating Particulate Filters," filed Jan. 21, 2009, the entire contents of which are incorporated by reference herein, in addition to the above porous wall structural properties, to not only maintain a low pressure drop when the filter is clean and a low initial back pressure increase during the deep-bed filtration stage, but also achieve a steep pressure drop response to particulate (e.g., soot) loading of the particulate filter during a cake-bed filtration stage. As used herein, the term "a steep pressure drop response to particulate loading of the particulate filter during a cake-bed filtration stage" refers to a filter that exhibits heightened sensitivity to particulate loading (as compared with conventional filters) during the latter stage of cake-bed filtration, resulting in a relatively large increase in pressure drop (as compared with conventional filters) of the fluid passing therethrough as the particulate filter is loaded with particulate matter.

Overall, however, based on the present teachings, those having skill in the art would understand how to modify a filter's properties, including, for example, its porous wall structural properties, to achieve the desired low clean pressure drop, high filtration efficiency, and low increase in initial back pressure during deep-bed filtration by taking into consideration the various positive performance characteristics of the structural properties described herein. Those having ordinary skill in the art also would understand how to modify a filter's geometric properties, in addition to its microstructural properties, to further achieve a relatively steep pressure drop response to particulate loading during cake-bed filtration, as disclosed in U.S. application Ser. No. 12/356,965, incorporated by reference herein.

Further, although various exemplary embodiments of the present teachings apply to diesel particulate filters used to filter ash and soot particulate matter, the present teachings encompass a wide range of filters useful in various applications and for filtering various types of particulate matters. Exemplary applications include, but are not limited to, for example, filters for use in coal combustion power plants, gasoline engines, and for stationary and non-stationary applications.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It should be understood that while the invention has been described in detail with respect to various exemplary embodiments thereof, it should not be considered limited to such, as numerous modifications are possible without departing from the broad scope of the appended claims.

We claim:

1. A particulate filter comprising:
an inlet end, an outlet end, and a plurality of channels disposed and configured to flow fluid from the inlet end to the outlet end, wherein the channels are defined by porous walls configured to trap particulate matter, the porous walls having:
a total porosity greater than about 45%, a median pore size ranging from about 13 micrometers to about 20 micrometers, and
a pore size distribution such that pores less than 10 micrometers contribute less than about 6% porosity.

2. The particulate filter of claim 1, wherein the total porosity ranges from about 45% to about 60%.

3. The particulate filter of claim 1, wherein the median pore size ranges from about 13 micrometers to about 16 micrometers.

4. The particulate filter of claim 1, wherein the pore size distribution is such that pores less than 10 micrometers contribute less than about 2% porosity.

5. The particulate filter of claim 1, wherein the porous walls have a cell density less than about 200 cpsi.

6. The particulate filter of claim 1, wherein the particulate filter is a honeycomb structure.

7. The particulate filter of claim 1, wherein the particulate filter is a wall-flow monolithic structure.

8. The particulate filter of claim 1, wherein the particulate filter is a partial-flow monolithic structure.

9. The particulate filter of claim 1, wherein the porous walls are configured to trap soot.

10. The particulate filter of claim 1, wherein the plurality of channels are configured to flow engine exhaust gas.

11. The particulate filter of claim 1, wherein the particulate filter is a diesel particulate filter.

12. The particulate filter of claim 1, wherein the particulate filter comprises a ceramic material.

13. The particulate filter of claim 12, wherein the particulate filter comprises cordierite.

14. The particulate filter of claim 12, wherein the particulate filter comprises silicon carbide.

* * * * *